United States Patent [19]

Hashimoto

[11] Patent Number: 4,805,204

[45] Date of Patent: Feb. 14, 1989

[54] AUTOMATIC TELEPHONE APPARATUS AND SET-UP METHOD THEREFOR

[75] Inventor: Kazuo Hashimoto, Tokyo, Japan

[73] Assignee: Hashimoto Corporation, Tokyo, Japan

[21] Appl. No.: 140,896

[22] Filed: Jan. 4, 1988

Related U.S. Application Data

[63] Continuation of Ser. No. 30,272, Mar. 20, 1987, abandoned, which is a continuation of Ser. No. 638,990, Aug. 9, 1984, abandoned.

[30] Foreign Application Priority Data

Aug. 11, 1983 [JP] Japan ................... 58-145747

[51] Int. Cl.$^4$ ............................................. H04M 1/65
[52] U.S. Cl. ........................................ 379/71; 379/72; 379/79
[58] Field of Search ................................. 379/68–72, 379/79

[56] References Cited

U.S. PATENT DOCUMENTS

| | | | |
|---|---|---|---|
| 3,261,111 | 7/1966 | Johnston et al. | 179/6.01 X |
| 4,069,397 | 1/1978 | Hashimoto | 179/6.13 X |
| 4,556,761 | 12/1985 | Hashimoto | 179/6.13 X |

FOREIGN PATENT DOCUMENTS

| | | | |
|---|---|---|---|
| 56-141649 | 11/1981 | Japan | 179/6.03 |
| 57-23353 | 2/1982 | Japan | 179/6.13 |

Primary Examiner—Robert L. Richardson
Assistant Examiner—W. R. Young
Attorney, Agent, or Firm—Lowe, Price, Leblanc, Becker & Shur

[57] ABSTRACT

In an automatic telephone answering apparatus, an outgoing message tape is driven upon reception of an incoming call, and a first outgoing message and a specific signal are reproduced. When the specific signal is detected, a timer is started. While the timer is being operated, a loudspeaker unit amplifies the voice of a caller. A non-recorded portion of the outgoing message tape is reproduced while the timer is being operated. When a preset timer time has elapsed, the second message is sent out onto a telephone line, and the telephone answering apparatus automatically sets itself in a standby mode.

3 Claims, 2 Drawing Sheets

AUTOMATIC TELEPHONE APPARATUS AND SET-UP METHOD THEREFOR

This application is a continuation of application Ser. No. 030,272 filed Mar. 20, 1987, which was a continuation of Ser. No. 638,990, filed Aug. 9, 1984, both now abandoned.

BACKGROUND OF THE INVENTION

The present invention relates generally to an automatic telephone answering apparatus for asking a calling party to speak his/her name upon reception of a call from the calling party and amplifying his/her voice so as to identify the calling party, and more particularly to a set-up method therefor.

Conventional automatic telephone answering apparatuses of this type are described in Japanese Patent Disclosure Nos. 51-110906 and 57-23353. According to such a conventional automatic telephone answering apparatus, a first outgoing message is recorded on an outgoing message tape to ask a calling party to speak his name, a blank tape portion is formed for a subsequent time interval to allow the calling party to speak his name, and a second outgoing message representing that a called party cannot answer the phone is recorded on the outgoing message tape. When an incoming call is actually received, a name of a calling party spoken during a period corresponding to the blank tape portion is amplified by a loudspeaker unit. When the called party checks the name of the caller, he answers the phone, if desired. In case a calling party will not speak his name, has a wrong number or is making a nuisance call, the outgoing message tape is kept running. After the second outgoing message tape is sent out to the calling party, the automatic telephone answering apparatus becomes set in the standby mode. However, in the technique described in Japanese Patent Disclosure No. 51-110906, an index such as a conductive tab is formed at the end of the first outgoing message recorded on the outgoing message tape. The index such as a tab is detected by an electrode, and a timer is started in response to the detection signal. The loudspeaker unit is operated for a time interval preset by the timer so as to amplify a name of a calling party. When the time interval preset by the timer has elapsed, the second outgoing message is sent out to the calling party. For this reason, the electrode for detecting the index is structurally separated in position from the play head. Therefore, it is difficult to synchronize a timing for interrupting the outgoing message with a timing for starting the loudspeaker and amplifying the voice of the calling party, resulting in inconvenience.

In the technique described in Japanese Patent Disclosure No. 57-23353, the above drawback is eliminated. However, a beep tone is recorded throughout the blank portion immediately after the first outgoing message. A time constant circuit is started a short period of time after the beep tone is detected. This time constant circuit generates an output while it detects the beep tone. A loudspeaker unit is started in response to the output from the time constant circuit so as to amplify the voice of the calling party. For this reason, the beep tone must be recorded throughout the blank portion of the outgoing message tape, resulting in inconvience.

SUMMARY OF THE INVENTION

It is an object of the present invention to provide an automatic telephone answering apparatus with a calling party check function, which overcomes the conventional drawbacks, and can start a loudspeaker unit in response to a specific signal for asking a calling party to speak his/her name to allow a called party to check the name of the calling party.

In order to achieve the above object of the present invention, a first outgoing message for asking a calling party to speak his name and a specific signal following the first outgoing message are recorded on an outgoing message tape, a non-recorded portion is formed after the recorded specific signal in the outgoing message tape for a predetermined period of time, and a second outgoing message representing that a called party cannot pick up the phone since he is absent is recorded after the non-recorded portion. When an incoming call is actually received, the outgoing message tape is automatically driven and the first outgoing message and the specific signal are reproduced by a reproducing/amplifying means. The reproduced first outgoing message and the specific signal are sent out onto a telephone line. After the specific signal is detected, the name or the like of the calling party given in response to the first outgoing message is amplified and generated by a means for starting a timer operated for a time interval corresponding to the non-recorded portion of the outgoing message tape and a means for amplifying the voice of the calling party upon operation of a switching means in response to an output from the timer. When the called party decides to answer the phone, he picks up a handset to communicate with the calling part. However, when the called party decides not to answer the phone, the outgoing message tape is kept running and the second outgoing message is reproduced. Thus, the automatic telephone answering apparatus is disengaged.

As described above, according to the present invention, the first outgoing message is reproduced to ask the calling party to speak his name, and the loudspeaker unit is started in response to the beep tone for signalling to the calling party to begin speaking his name. Therefore, the timing at which the calling party speaks his name can easily be matched with the timing at which the loudspeaker unit is started. As a result, the name of the calling party can be properly checked by the called party, and the outgoing messages will not be reproduced at the loudspeaker. Furthermore, the voice of the calling party is amplified for only 2 to 3 seconds preset by a timer, thereby preventing ambient noise.

Furthermore, the called party can answer the phone as desired. The called party need not answer the phone for a wrong number, a nuisance call or an unnecessary call from a salesman. In this manner, the automatic telephone answering apparatus according to the present invention serves as a secretary.

Furthermore, the voice amplification time is preset by the timer. It is possible to amplify a longer message until the tape comes to an end if the preset time of the timer is elongated.

As is apparent, it is important to record the outgoing messages in such a manner that the second outgoing message will be reproduced just after the elapse of a time period corresponding to the non-recorded portion of the outgoing message tape. It is unnatural if no second outgoing message is reproduced to the caller just after the timer times out in the automatic answering mode.

Accordingly, in the invention, initial set-up of the apparatus is made more convenient to a user preparing the outgoing messages by using the speaker to reproduce microphone noise as well as voice signals on the outgoing message tape. In this way the user can determine when the background noise of the microphone and tape terminates whereby the duration of the timer has expired, and it is time to record the second outgoing message. This eliminates any need for an indicator lamp dedicated to that purpose.

Accordingly, another object is to make initial set-up of an automatic telephone answering device more convenient to a user.

A further object is to minimize the number of display lamps required in an automatic telephone answering device.

DETAILED DESCRIPTION OF THE PREFERRED EMBODIMENT

An automatic telephone answering apparatus with a calling party check function will be described with reference to the accompanying drawings.

Figure 1:
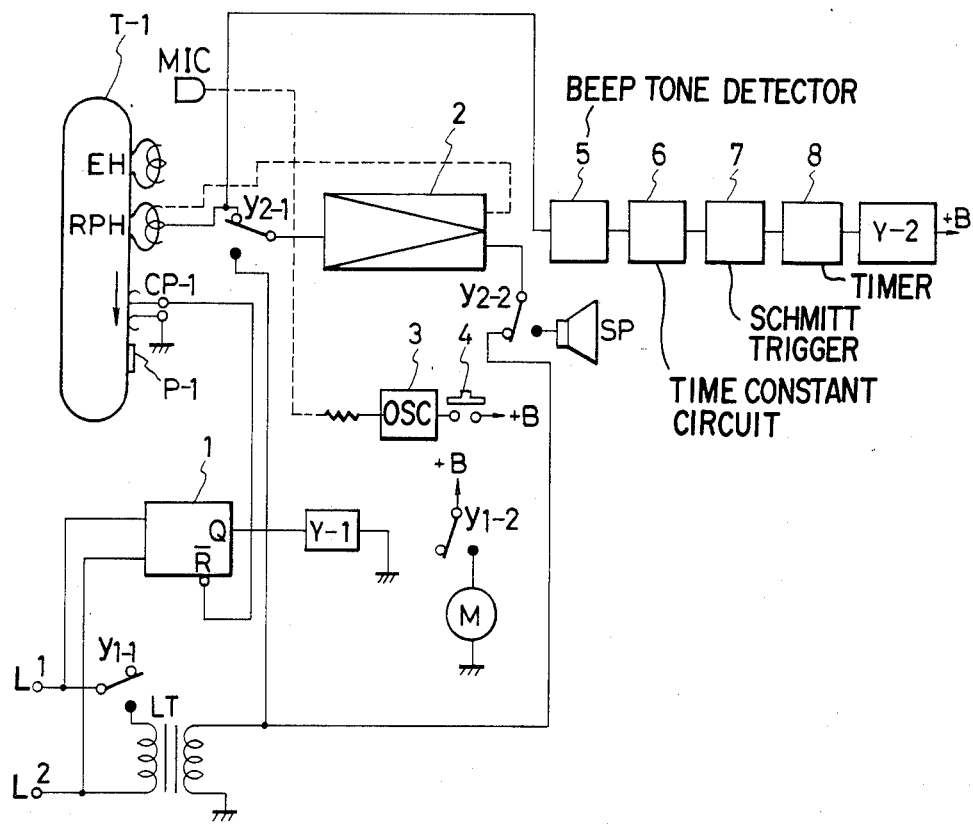
FIG. 1 is a block diagram of an automatic telephone answering apparatus with a calling party check function according to an embodiment of the present invention.

Referring to FIG. 1, reference symbols L1 and L2 denote telephone lines; and LT, a line transformer. Reference numeral 1 denotes a ringing amplifier for setting a built-in flip-flop through a time constant circuit of a capacitor and a resistor after a ringing signal is detected by a built-in photocoupler, and for resetting the flip-flop when a reset terminal R thereof goes to a first predetermined level L.

Reference symbol Y-1 denotes a relay operated when the flip-flop in the ringing amplifier 1 is set and an output terminal Q thereof is set at a second and different predetermined level H. Reference numeral 2 denotes a voice amplifier; 3, an oscillator (OSC) for oscillating an audible signal of a specific signal called a beep tone for signalling to a calling party to begin speaking his name; 4, a pushbutton for supplying power to the oscillator 3; 5, a beep tone detector (BTD) such as a filter for detecting a signal recorded on an outgoing message tape T-1; 6, a time constant circuit (TCC) which is charged/discharged in response to a beep tone detection output from the beep tone detector 5; 7, a Schmitt trigger (STC) circuit for receiving the output from the time constant circuit 6 and generating a pulse; and 8, a timer (TMR) which is set in response to the trailing edge of the pulse from the Schmitt trigger circuit 7 and supplying an output of said first level L to a relay Y-2 for a predetermined period of time.

The outgoing message tape T-1 comprises an endless tape in this embodiment. Reference symbol P-1 denotes a conductive tab attached at the starting point of the outgoing message tape T-1; CR-1, an electrode which is rendered conductive by the tab P-1; EH, an erase head; and RPH, a record/play head. Reference symbol M denotes a motor for driving the outgoing message tape T-1. Reference symbol SP, a loudspeaker; y1-1 and y1-2, contacts of the relay Y-1; y2-1 and y2-2, contacts of the relay Y-2; and MIC, a microphone. A circuit indicated by the dotted line is used to record an outgoing message on the outgoing message tape T-1.

Figure 2:
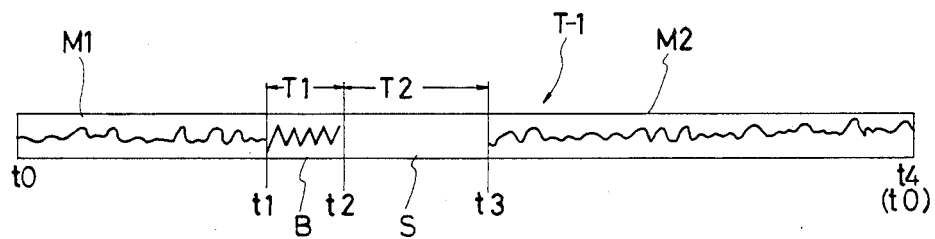
FIG. 2 shows a state of a recorded state of the outgoing message tape used in the automatic telephone answering apparatus shown in FIG. 1.
Figure 3:
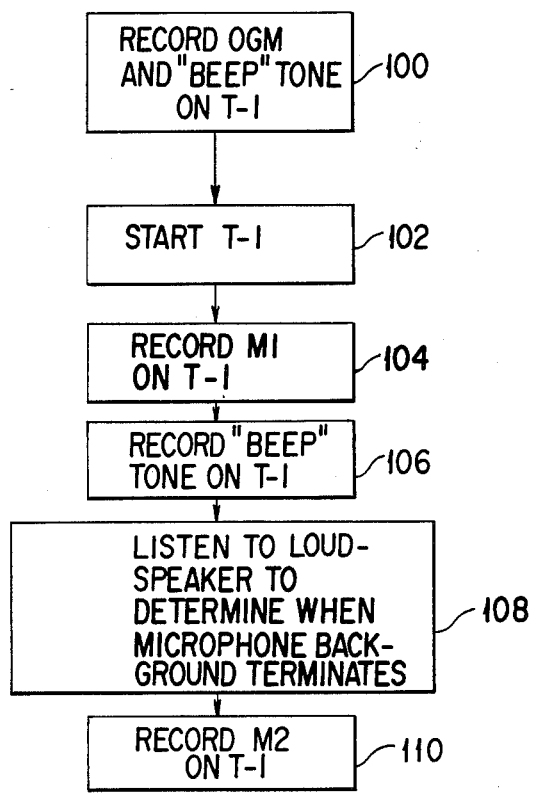
FIG. 3 is a chart showing initial set up of the apparatus for recording first and second outgoing messages.

FIG. 2 shows a recorded state of the outgoing message tape T-1. A first outgoing message M1 for asking the calling party to speak his name is recorded for a time interval from time t0 to time t1. A beep tone B is recorded for a time interval between time t1 to time t2. A non-recorded portion S corresponds to a time interval between time t2 and time t3. A second output going message M2 representing that the called party cannot answer the phone is recorded for a time interval between time t3 and time t4 (t0).

As is apparent from the foregoing, an outgoing message tape is employed in which a first outgoing message asking a caller to speak his name, a specific signal, a non-recorded portion and a second outgoing message representing that a called party cannot answer the caller are recorded in succession. Further, the voice of the caller is amplified for a time period corresponding to the non-recorded portion and set by a timer, during which time period the outgoing message tape is kept running.

Therefore, in recording the outgoing messages, etc. prior to use of the apparatus, i.e., during initial set-up, it is required to record the same in such a manner that the second has timed out, and at that time, to record the second outgoing message M2. Although a light-emitting diode (LED) responsive to an output of the timer 8 might be employed for indication of correct timing to start recording of the second outgoing message, some devices do not have sufficient surface space to accommodate an LED for that purpose. Because the invention employs amplification of voice and noise for reproduction in the loudspeaker to provide an indication of the timing of timer 8, no LED or other indicator is required.

The operation of the automatic telephone answering apparatus having the arrangement described abvoe will now be described. First, the outgoing messages and the specific signal called the beep tone are recorded on the outgoing message tape T-1. In this case, the noice amplifier 2, the microphone MIC, the record/play head RPH and the oscillator 3 are connected as indicated by the dotted line. A user depresses a known start button (not shown) to drive the outgoing message tape T-1. The user then records the first outgoing message M1 for the time interval between time t0 and time t1 by the microphone MIC. The first outgoing message M1 is given as, for example, "This is Hashimoto Corporation. Who is calling?" so as to ask the caller to speak his name. Subsequently, the user continuously depresses the pushbutton 4 for a time interval T1 (i.e., one second) to cause the oscillator 3 to continuously oscillate for the time interval between time t1 and time t2, thereby recording the beep tone B. The non-recorded portion S is formed for a sufficient time interval T2 (enough to allow the calling party to speak his name) preset by the timer 8. Finally, the second outgoing message M2 is recorded after time t3 and is given as, for example, "He is out now. Please call him back later." In order to match the time interval T2 preset by the timer 8 with that corresponding to the non-recorded portion S (i.e., in order to ensure the second outgoing message is recorded when the count of the timer 8 has reached the preset value at time t3 after the time interval T2), the user must depress the pushbutton 4 for about one second. While the beep tone B from the oscillator 3 is recorded on the outgoing message tape T-1 for one second, the beep tone B is supplied to the beep tone detector 5 through the contact y2-1 of the relay Y-2. An output from the beep tone detector 5 is supplied to the time constant circuit 6 which then drives the Schmitt trigger circuit 7. The output from the Schmitt trigger circuit 7 falls substantially simultaneously with the time t2 at which the user releases the pushbutton 4. The timer 8 is started to energize the relay Y-2. The contacts y2-1 and y2-2 of the relay Y-2 are switched, so that the loudspeaker SP is connected to the amplifier 2 for a predetermined period of time. During this period, the voice is reproduced at the loudspeaker SP when the voice is inputted through the microphone MIC. When the count of the timer 8 has reached the preset value (time t3), the contact y2-2 of the relay Y-2 is switched. In this case, the voice can no longer be produced at the loudspeaker SP. The user knows that the count of the timer 8 has reached the preset value. When the user then records the second outgoing message M2 from this time (time t3) from the microphone MIC, the preset time T2 of the timer 8 matches with that corresponding to the non-recorded portion S. As a result, the recording timing of the second outgoing message M2 will not be deviated.

The outgoing message tape T-1 recorded as described above is set in the automatic telephone answering apparatus, and this automatic telephone answering apparatus is set with a telephone device and set in the standby mode. When an incoming call is received from a third party, a ringing signal is detected by the ringing amplifier 1 to hold the relay Y-1 as a load in an operative state so as to form a loop through the contact y1-1. The motor M is driven through the contact y1-2, and the outgoing message tape T-1 is driven in the direction indicated by the arrow in FIG. 1.

The first outgoing message M1 prerecorded on the outgoing message tape T-1 is reproduced from time t0 (FIG. 2) and is sent onto to the telephone line through the record/play head RPH, the contact y2-1, the amplifier 2, the contact y2-2 and the line transformer LT. The first outgoing message M1 is given as, e.g., "This is Hashimoto Corporation. Who is calling?" so as to ask the calling party to speak his name. Thereafter, the beep tone B recorded between time t1 and time t2 is reproduced. The beep tone B is discriminated from the outgoing message and is detected by the beep tone detector 5. An output from the beep tone detector 5 is supplied to the time constant circuit 6. An output from the time constant circuit 6 drives the Schmitt trigger circuit 7 to stop generating the beep tone after about one second. The output from the Schmitt trigger circuit falls, and this low level output then drives the timer 8 and then the relay Y-2 (at time t2). The relay Y-2 is set in the black dot positions of contacts y2-1 and y2-2, the input side of the amplifier 2 is switched from the record/play head RPH to the line transformer LT, and the output side of the amplifier 2 is switched from the line transformer LT to the loudspeaker SP. When the calling party speaks his name in response to the first outgoing message M1, his voice is amplified through the line transformer LT, the contact y2-1, the amplifier 2, the contact y2-2 and the loudspeaker SP. When the preset time T2 of the timer 8 has elapsed (at time t3), the relay Y-2 is reset such that the contacts y2-1 and y2-2 are located at the respective positions shown in FIG. 1. The second outgoing message M2 representing that the called party cannot answer the phone is reproduced from time t3 in FIG. 2. The second outgoing message is sent out to the calling party. When the outgoing message tape T-1 returns to the beginning, the tab P-1 is brought into contact with the electrode CP-1, and the relay Y-1 is reset through the reset terminal R of the ringing amplifier 1, thereby opening the loop. As a result, the outgoing message tape T-1 stops travelling, and the automatic telephone answering apparatus is set in the standby mode.

The automatic telephone answering apparatus according to the present invention is operated as described above. The called party hears the name of the calling party which is reproduced at the loudspeaker. If desired, he picks up the handset and talks with the calling party. However, when the calling party does not speak his name, has a wrong number or is making a nuisance call, the outgoing message tape is kept running, and the second outgoing message M2 is sent out to the calling party. Thereafter, the automatic telephone answering apparatus is set in the standby mode.

In the above embodiment, the outgoing message tape T-1 comprises an endless tape. However, the outgoing message tape T-1 may comprise a tape with start and end points. In this case, the tape must be rewound when the tape reaches its end point.

What is claimed is:

1. An automatic telephone answering apparatus having a calling party check function, to automatically drive an outgoing message tape upon reception of an incoming call, to send out an outgoing message onto a telephone line and to be disengaged, comprising:

an outgoing message tape recorded with a first outgoing message at a beginning thereof, a specific signal, a non-recorded portion for a interval and a second outgoing message, the first outgoing message asking a calling party to speak his name, and the second outgoing message representing that a called party cannot answer the caller since the called party is absent;

a microphone for recording outgoing messages on the outgoing message tape;

means for reproducing, amplifying and sending out the first and second outgoing messages and said specific signal onto the telephone line;

variable time duration timer means settable by the called party for generating a signal for the predetermined time interval of the non-recorded portion of said outgoing message tape, said predetermined time interval settable by said timer means being long enough to enable said non-recorded portion of such outgoing message tape to extend to an end thereof;

means for detecting said specific signal to start said timer means;

loudspeaker means for amplifying any signals from the microphone as well as the voice of the calling party during the predetermined time interval corresponding to said nonrecorded portion of said outgoing message tape; and means responsive to the signal from said timer means for inputting said voice of the calling party and for connecting an output of said microphone, said output including background noise to said loudspeaker means for the predetermined time interval, wherein during initial set-up of the telephone answering apparatus, when background noise of the microphone terminates, a user knows that the predetermined time of said timer has expired, and said second outgoing message should now be recorded by the user.

2. An apparatus according to claim 1, wherein the specific signal comprises a beep tone or the like for signalling to the calling party to begin speaking his name.

3. In an automatic telephone answering apparatus having a calling party check function, to automatically drive an outgoing message tape upon reception of an incoming call, to send out an outgoing message onto a telephone line and to be disengaged, comprising an outgoing message tape recorded with a first outgoing message at a beginning thereof, a specific signal, a non-recorded portion for a predetermined time interval and a second outgoing message, the first outgoing message asking a calling party to speak his name, and the second outgoing message representing that a called party cannot answer the caller since the called party is absent; a microphone for recording outgoing messages on the outgoing message tape; means for reproducing, amplifying and sending out the first and second outgoing messages and said specific signal onto the telephone line; variable time duration timer means settable by the called party for generating a signal for the predetermined time interval of the non-recorded portion of said outgoing message tape, said predetermined time interval settable by said timer means being long enough to enable said non-recorded portion of such outgoing message tape to extend to an end thereof; means for detecting said specific signal to start said timer means; loudspeaker means to amplify any signals from the microphone as well as the voice of the calling party during the predetermined time interval corresponding to said non-recorded portion of said outgoing message tape; and means responsive to the signal from said timer means to input said voice of the calling party and other microphone signals including background noise to said loudspeaker means for the predetermined time interval;

a method of initializing said telephone answering apparatus with said first and second outgoing messages, comprising the steps of:

recording on the outgoing message tape the first outgoing message during a first time interval and the specific signal during a second time interval;

connecting the microphone to the loudspeaker means for the predetermined time interval;

listening to the output of said loudspeaker means, advancing the tape while listening, determining when no voice or other microphone signals including background noises are generated by the loudspeaker means, and recording said second outgoing message on said tape.

* * * * *